(12) United States Patent
Streibig

(10) Patent No.: US 6,786,597 B2
(45) Date of Patent: Sep. 7, 2004

(54) TINTED CONTACT LENS AND METHOD FOR MAKING SAME

(75) Inventor: Daniel G. Streibig, Ballwin, MO (US)

(73) Assignee: Ocular Sciences, Inc., Concord, CA (US)

(*) Notice: Subject to any disclaimer, the term of this patent is extended or adjusted under 35 U.S.C. 154(b) by 0 days.

(21) Appl. No.: 10/268,231

(22) Filed: Oct. 10, 2002

(65) Prior Publication Data

US 2003/0048409 A1 Mar. 13, 2003

Related U.S. Application Data

(60) Continuation of application No. 10/229,229, filed on Aug. 27, 2002, which is a continuation of application No. 09/678,195, filed on Oct. 4, 2000, now Pat. No. 6,488,376, which is a division of application No. 09/428,817, filed on Oct. 28, 1999, now Pat. No. 6,488,375.

(51) Int. Cl.[7] ................................................. G02C 7/04
(52) U.S. Cl. ........................................ 351/162; 351/177
(58) Field of Search ........................ 351/160 R, 160 H, 351/161, 162, 177

(56) References Cited

U.S. PATENT DOCUMENTS

| | | | |
|---|---|---|---|
| D211,757 S | 7/1968 | Urbach | D16/101 |
| 3,536,386 A | 10/1970 | Spivack | 351/160 R |
| 3,679,504 A | 7/1972 | Wichterle | 156/62 |
| 3,712,718 A | 1/1973 | Legrand et al. | 351/160 R |
| 4,099,859 A | 7/1978 | Merrill | 351/160 H |
| 4,130,708 A | 12/1978 | Friedlander et al. | 528/28 |
| 4,136,250 A | 1/1979 | Mueller et al. | 528/29 |
| 4,153,641 A | 5/1979 | Deichert et al. | 526/264 |
| 4,158,089 A | 6/1979 | Loshaek et al. | 526/264 |
| 4,182,802 A | 1/1980 | Loshaek et al. | 526/264 |
| 4,189,546 A | 2/1980 | Deichert et al. | 528/26 |
| 4,405,773 A | 9/1983 | Loshaek et al. | 526/318.42 |
| 4,413,104 A | 11/1983 | Deubzer et al. | 525/479 |
| 4,424,328 A | 1/1984 | Ellis | 526/279 |
| 4,433,125 A | 2/1984 | Ichinohe et al. | 526/279 |
| 4,460,523 A * | 7/1984 | Neefe | 264/1.9 |
| 4,463,149 A | 7/1984 | Ellis | 526/279 |
| 4,472,327 A | 9/1984 | Neefe | 428/411.1 |
| 4,525,044 A | 6/1985 | Bauman | 351/160 H |
| 4,558,931 A | 12/1985 | Fuhrman | 351/160 H |
| 4,559,059 A | 12/1985 | Su | 8/507 |

(List continued on next page.)

FOREIGN PATENT DOCUMENTS

| | | |
|---|---|---|
| CA | 710230 | 5/1965 |
| DE | 4012279 | 10/1991 |
| DE | 19518587 | 11/1996 |

(List continued on next page.)

OTHER PUBLICATIONS

Affidavit of Daniel G. Streibig dated Dec. 11, 2001.*
J. Künzler et al, "Hydrogels Based on Hydrophilic Side-Chain Siloxanes", Journal of Applied Science, vol. 55, pp. 611-619 (1995).

(List continued on next page.)

*Primary Examiner*—Jordan M. Schwartz
(74) *Attorney, Agent, or Firm*—Stout, Uxa, Buyan & Mullins, LLP; Frank J. Uxa (57) ABSTRACT

A tinted contact lens for insertion into an eye comprises a contact lens substrate and an iris-simulating pattern on the lens substrate. The iris simulating pattern comprises at least four distinctly colored colorants. A method for making a tinted contact lens for insertion into an eye comprises providing a plate having a surface, and lasing the plate to form at least one depression in the surface of the plate. The depression is of a shape constituting an iris portion pattern. A fluent colorant is introduced into the depression. The colorant is then transferred from the depression to a lens substrate in a manner so that the colorant colors the lens substrate in a colorant pattern of substantially the same shape as the iris portion pattern of the depression.

32 Claims, 5 Drawing Sheets

U.S. PATENT DOCUMENTS

| | | | | |
|---|---|---|---|---|
| 4,582,402 | A | 4/1986 | Knapp | 351/162 |
| 4,605,712 | A | 8/1986 | Mueller et al. | 525/474 |
| 4,638,025 | A | 1/1987 | Fuhrman | 524/40 |
| 4,652,622 | A | 3/1987 | Friends et al. | 526/279 |
| 4,668,240 | A | 5/1987 | Loshaek | 8/507 |
| 4,681,412 | A | 7/1987 | Lemelson | 351/162 |
| 4,686,267 | A | 8/1987 | Ellis et al. | 526/245 |
| 4,701,038 | A | 10/1987 | Neefe | 351/162 |
| 4,704,017 | A | 11/1987 | Knapp | 351/162 |
| 4,711,943 | A | 12/1987 | Harvey, III | 526/279 |
| 4,719,657 | A | 1/1988 | Bawa | 8/453 |
| 4,720,188 | A | 1/1988 | Knapp | 351/177 |
| 4,740,533 | A | 4/1988 | Su et al. | 523/106 |
| 4,744,647 | A | 5/1988 | Meshel et al. | 351/177 |
| 4,745,857 | A | 5/1988 | Putnam et al. | 101/44 |
| 4,810,764 | A | 3/1989 | Friends et al. | 526/245 |
| 4,840,477 | A | 6/1989 | Neefe | 351/162 |
| 4,857,072 | A | 8/1989 | Narducy et al. | 8/507 |
| 4,867,552 | A | 9/1989 | Neefe | 351/162 |
| 4,872,405 | A | 10/1989 | Sterman | 101/44 |
| 4,889,421 | A | 12/1989 | Cohen | 351/162 |
| 4,921,205 | A | 5/1990 | Drew, Jr. et al. | 249/61 |
| 4,940,751 | A | 7/1990 | Frances et al. | 525/54.2 |
| 4,946,269 | A | 8/1990 | Magdassi | 351/162 |
| 4,963,159 | A | 10/1990 | Narducy et al. | 8/507 |
| 5,018,849 | A | 5/1991 | Su et al. | 351/177 |
| 5,070,169 | A | 12/1991 | Robertson et al. | 528/25 |
| 5,070,170 | A | 12/1991 | Robertson et al. | 528/25 |
| 5,120,121 | A | 6/1992 | Rawlings et al. | 351/162 |
| 5,126,531 | A | 6/1992 | Majima et al. | 219/121.68 |
| 5,158,717 | A | 10/1992 | Lai | 264/1.1 |
| 5,158,718 | A | 10/1992 | Thakrar et al. | 264/1.36 |
| 5,160,463 | A | 11/1992 | Evans et al. | 264/1.7 |
| 5,196,493 | A | 3/1993 | Gruber et al. | 526/245 |
| 5,205,212 | A | 4/1993 | Wolfe | 101/170 |
| 5,238,613 | A | 8/1993 | Anderson | 264/425 |
| 5,244,470 | A | 9/1993 | Onda et al. | 8/507 |
| 5,244,799 | A | 9/1993 | Anderson | 435/397 |
| 5,260,000 | A | 11/1993 | Nandu et al. | 264/2.1 |
| 5,272,010 | A | 12/1993 | Quinn | 428/411.1 |
| 5,302,978 | A | 4/1994 | Evans et al. | 351/162 |
| 5,307,740 | A | 5/1994 | Yamamoto et al. | 101/44 |
| 5,310,779 | A | 5/1994 | Lai | 524/588 |
| 5,334,681 | A | 8/1994 | Mueller et al. | 526/243 |
| 5,346,946 | A | 9/1994 | Yokoyama et al. | 524/547 |
| 5,387,663 | A | 2/1995 | McGee et al. | 526/279 |
| 5,414,477 | A | 5/1995 | Jahnke | 351/162 |
| 5,467,149 | A | 11/1995 | Morrison et al. | 351/162 |
| 5,637,265 | A | 6/1997 | Misciagno et al. | 264/1.7 |
| 5,704,017 | A | 12/1997 | Heckerman et al. | 706/12 |
| 5,713,963 | A | 2/1998 | Bensky | 8/507 |
| 5,733,333 | A | 3/1998 | Sankey | 623/4.1 |
| 5,757,458 | A | 5/1998 | Miller et al. | 351/162 |
| 5,786,883 | A | 7/1998 | Miller et al. | 351/162 |
| 5,867,247 | A | 2/1999 | Martin et al. | 351/177 |
| 5,936,704 | A | 8/1999 | Gabrielian et al. | 351/160 R |
| 5,936,705 | A | 8/1999 | Ocampo et al. | 351/162 |
| 6,030,078 | A | 2/2000 | Ocampo | 351/162 |
| 6,070,527 | A | 6/2000 | Yamane et al. | 101/150 |
| 6,099,379 | A * | 8/2000 | Eppley | 446/392 |
| 6,143,026 | A | 11/2000 | Meakem | 623/901 |
| 6,196,683 | B1 | 3/2001 | Quinn et al. | 351/162 |
| 6,213,604 | B1 | 4/2001 | Valint et al. | 351/177 |
| 6,276,266 | B1 | 8/2001 | Dietz et al. | 101/41 |
| 6,315,410 | B1 | 11/2001 | Doshi | 351/162 |
| 6,337,040 | B1 * | 1/2002 | Thakrar et al. | 264/1.7 |

FOREIGN PATENT DOCUMENTS

| | | |
|---|---|---|
| EP | 0108886 | 5/1984 |
| EP | 0114894 | 8/1984 |
| EP | 0277771 | 8/1988 |
| EP | 0295947 | 12/1988 |
| EP | 0330616 | 8/1989 |
| EP | 0369942 | 5/1990 |
| EP | 0390443 | 10/1990 |
| EP | 0395583 | 10/1990 |
| EP | 0425436 | 5/1991 |
| EP | 0461270 | 12/1991 |
| EP | 0472496 | 2/1992 |
| EP | 0484044 | 5/1992 |
| EP | 0584764 | 3/1994 |
| EP | 0643083 | 3/1995 |
| JP | 62-288812 | 12/1967 |
| JP | 8112566 | 5/1996 |
| WO | 83/03480 | 10/1983 |
| WO | 9106886 | 5/1991 |
| WO | WO91/06886 | 5/1991 |
| WO | WO92/07013 | 4/1992 |
| WO | WO93/05085 | 3/1993 |
| WO | WO93/09154 | 5/1993 |
| WO | 9946630 | 9/1999 |
| WO | WO01/40846 | 6/2001 |
| WO | WO 02/074186 | 9/2002 |

OTHER PUBLICATIONS

Lai, Yu–Chin, "Role of Bulky Polysiloxanylalkyl Methacrylates In Oxygen–Permeable Hydrogel Materials", Journal Applied Sci., vol. 56, pp. 317–324, (1995).

Lai, Yu–Chin, "Novel Polyurethane–Silicone Hydrogels", Journal of Applied Science, vol. 56, pp. 301–310, (1995).

Affidavit of Daniel G. Streibig dated Dec. 11, 2001.

Affidavit of Daniel G. Streibig dated May 18, 2002.

* cited by examiner

TINTED CONTACT LENS AND METHOD FOR MAKING SAME

This application is a continuation of application Ser. No. 10/229,229 filed Aug. 27, 2002, which is a continuation of application Ser. No. 09/678,195 filed Oct. 4, 2000, now U.S. Pat. No. 6,488,376, which is a divisional application Ser. No. 09/428,817, filed Oct. 28, 1999, now U.S. Pat. No. 6,488,375, the disclosure of each of which applications is incorporated in its entirety herein by reference.

BACKGROUND OF THE INVENTION

This invention relates to tinted contact lenses and methods of making tinted contact lenses.

Tinted contact lenses are often used for cosmetic purposes to change the apparent color of the wearer's irises. For example, a person with brown or blue eyes but desiring to have green eyes may wear contact lenses having a greenish pattern thereon to mask the wearer's irises with the greenish pattern.

Conventionally, tinting of contact lenses is achieved by printing a colored pattern onto a lens substrate via a pad printing process. It is to be understood that the term "tinted" is intended to encompass colored patterns of translucent and/or opaque pigmentations. The pad printing process employs a generally flat steel plate also known as a cliché. A pattern (or depression) is etched into the cliché by a photo-etching process. In operation, ink placed in the pattern is transferred to the lens substrate by a printing pad. To achieve a tinted lens of multiple colors, different colored inks are placed into three or fewer different patterns and serially transferred to the lens substrate by printing pads.

A disadvantage associated with conventional methods of tinting contact lens substrates is that such methods cannot achieve patterns of high resolution. In other words, the printed pattern on the lens substrate does not have nearly the detail of a human iris. The inability to achieve patterns of high resolution also prevents use of more than three different patterns on a lens substrate. As such, an observer viewing the wearer's eyes from five feet away or closer may determine that the wearer is wearing tinted lenses. Another disadvantage is the extensive labor needed to etch a pattern into the cliché. Typically, four to six "man-hours" are required to etch each pattern. Moreover, the pattern must generally be etched to precise depths so that the ink can be transferred effectively. Etching to such precise depths is often difficult. In many intricate or detailed patterns, depth variances of 3–5 microns may render the cliché useless. Another disadvantage is that the corrosive chemicals (e.g., ferric chloride and hydrochloric acid) used to etch the pattern in the cliché are hazardous both to workers and to the environment. Thus, enhanced care and cost are needed in using and disposing of the chemicals.

SUMMARY OF THE INVENTION

Among the several objects and advantages of the present invention may be noted the provision of an improved method for tinting contact lens substrates; the provision of such a method of tinting a lens substrate in which the tinted lens substrate more closely resembles a human iris than does a tinted lens substrate made by conventional methods; the provision of a method of tinting a lens substrate to form a tinted lens having a pattern of greater intricacy; the provision of an improved method of forming a pattern in a cliché; the provision of a method of forming a precise, intricate pattern in a cliché; the provision of such a method of forming such a pattern in a less labor-intensive manner; the provision of a method of forming a pattern in a cliche without use of hazardous chemicals; and the provision of a tinted contact lens having a lens substrate a colorant image printed thereon of greater resolution than images printed on prior art tinted contact lenses.

In general, a method of the present invention for making a tinted contact lens for insertion into an eye comprises providing a plate having a surface, and lasing the plate to form at least one depression in the surface of the plate. The depression is of a shape constituting an iris portion pattern. A fluent colorant is introduced into the depression. The colorant is then transferred from the depression to a lens substrate in a manner so that the colorant colors the lens substrate in a colorant pattern of substantially the same shape as the iris portion pattern of the depression.

In another aspect of the present invention, a method of making a tinted contact lens for insertion into an eye comprises digitizing an image of a human iris into a computer. The digitized image is separated into a plurality of digitized image portions, which are used to form a plurality of depressions in a plurality of cliché portions. Each depression is of a shape constituting an iris portion pattern. Fluent colorants are introduced into the plurality of depressions. The colorants are transferred from the depressions to the lens substrate in a manner so that the colorants color the lens substrate in a plurality of colorant patterns of substantially the same shape as the iris portion patterns of the depressions. The colorant patterns combine with one another to color the lens substrate in a manner to simulate a human iris.

In yet another aspect of the present invention, a tinted contact lens for insertion into an eye comprises a contact lens substrate and an iris-simulating pattern on the lens substrate. The iris simulating pattern comprises at least four distinctly colored colorants.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
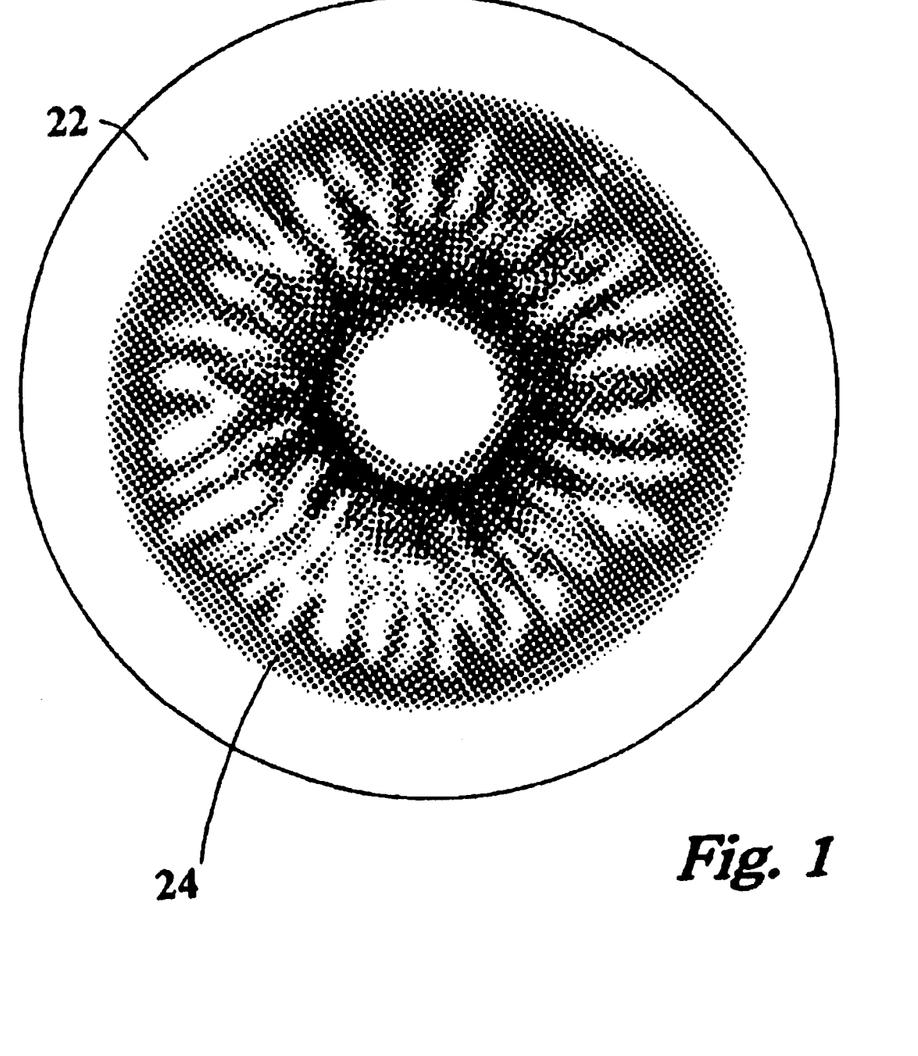
FIG. 1 is a top plan view of a tinted contact lens of the present invention having a contact lens substrate and an iris simulating design printed on the substrate.
Figure 2A:
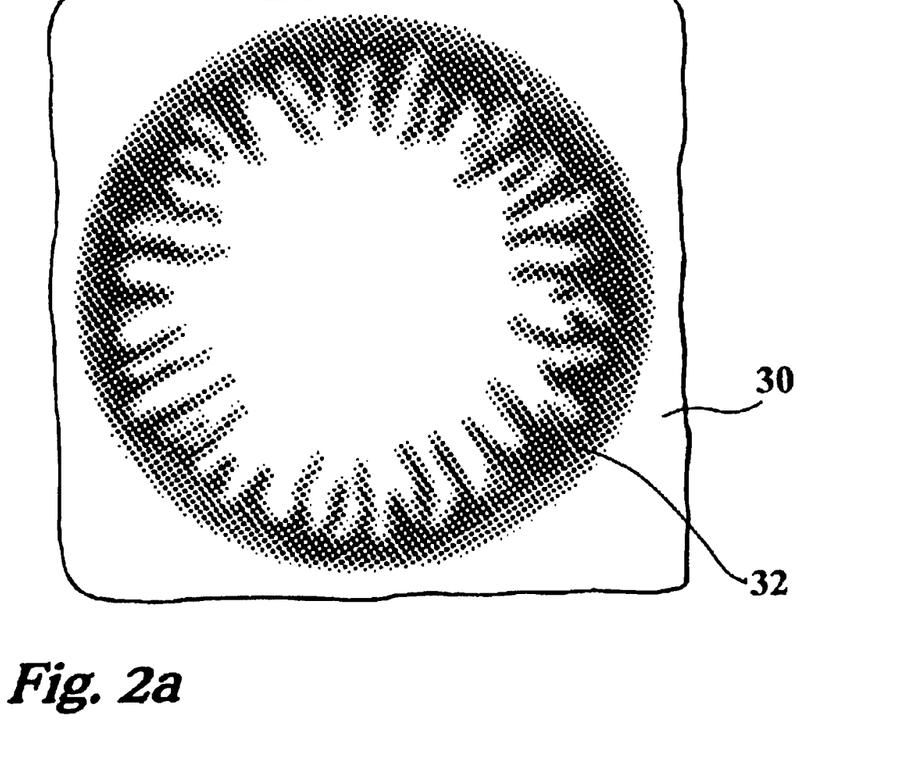
FIG. 2a is fragmented top plan view of a printing plate (cliché) portion having a first depression therein, the first depression being in the shape of a first iris portion pattern to be printed onto a contact lens substrate to form a first portion of the iris simulating design of FIG. 1.
Figure 2B:
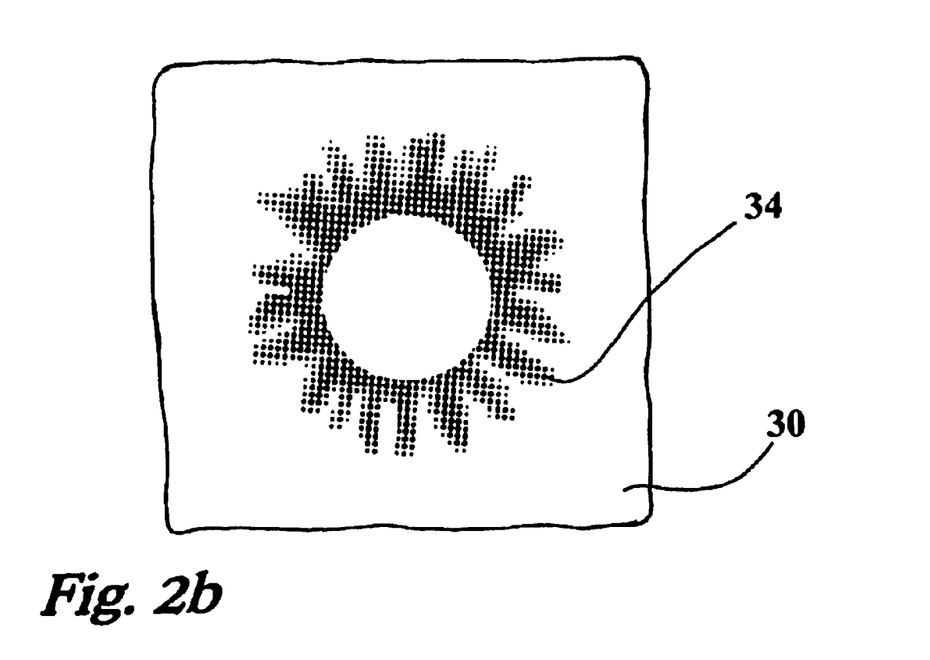
FIG. 2b is fragmented top plan view of a cliché portion having a second depression therein, the second depression being in the shape of a second iris portion pattern to be printed onto a contact lens substrate to form a second portion of the iris simulating design of FIG. 1.
Figure 2C:
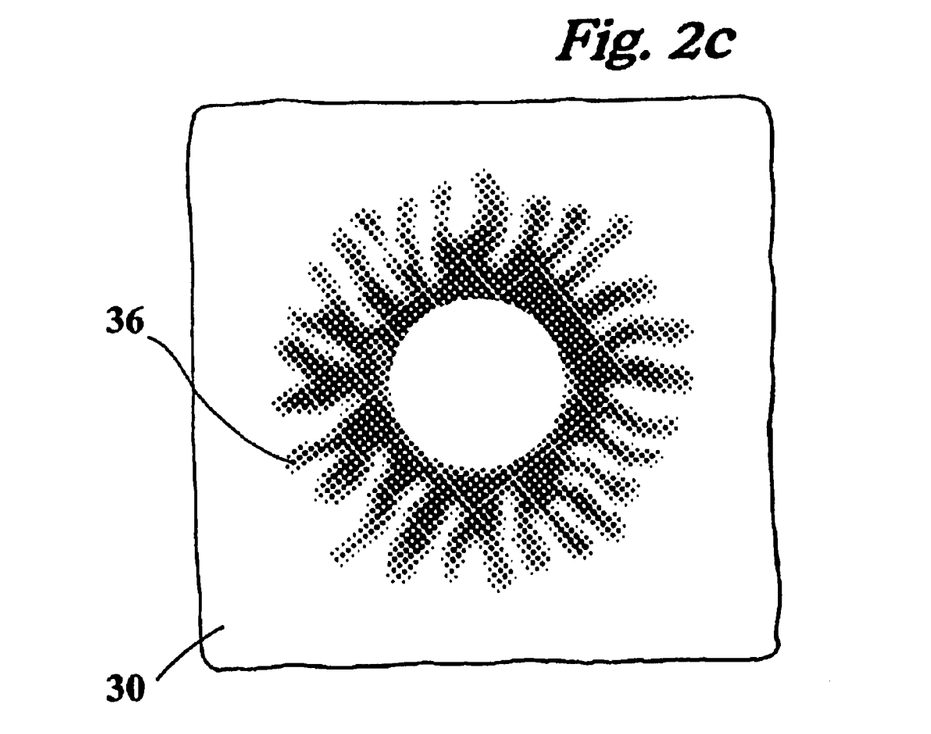
FIG. 2c is fragmented top plan view of a cliché portion having a third depression therein, the third depression being in the shape of a third iris portion pattern to be printed onto a contact lens substrate to form a third portion of the iris simulating design of FIG. 1.
Figure 2D:
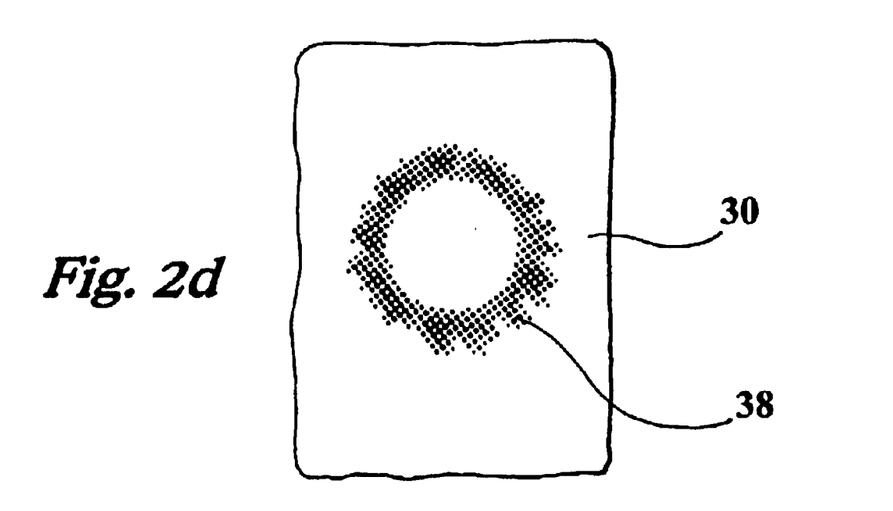
FIG. 2d is fragmented top plan view of a cliché portion having a fourth depression therein, the fourth depression being in the shape of a fourth iris portion pattern to be printed onto a contact lens substrate to form a fourth portion of the iris simulating design of FIG. 1.

Referring now to the drawings and first more particularly to FIG. 1, a tinted contact lens of the present invention is indicated in its entirety by the reference numeral 20. The contact lens 20 comprises a contact lens substrate 22 and an iris-simulating design, generally indicated at 24, on the lens substrate. The contact lens substrate 22 is preferably a conventional clear contact lens. The lens substrate 22 may be a corrective or non-corrective lens. The iris simulating design 24 is generally annular in shape and is sized to cover or enhance a wearer's iris. The iris simulating design 24 may be opaque to partially or completely mask the wearer's iris or may be at least somewhat translucent so that some of the wearer's iris may show through the design. It is to be understood that the term "tinted" is intended to encompass both iris simulating designs of translucent and/or opaque pigmentations. Preferably, the iris-simulating design 24 is multi-colored and is more preferably comprised of four or more separate colors. A pad printing process is preferably used to print the iris-simulating design 24 on the lens substrate 22. As described in greater detail below, four or more separate design portions (each preferably of a different color) are serially printed on the lens substrate 22 during the printing process. The design portions (colorant patterns) combine to form the multi-colored iris-simulating pattern 44.

Generally speaking, two sub-processes are used for making the tinted contact lens 20. The first sub-process is formation of a plurality of depressions 32, 34, 36, 38 (FIGS. 2a–d) in one or more printing plates (clichés) 30. The second sub-process is using the cliché(s) 30 in a pad printing process to transfer ink (or some other suitable fluent colorant) from the depressions to the lens substrate 22 (FIG. 1). Preferably, the ink is of a type well known in the tinted contact lens industry having binding properties enabling it to adhere to the lens substrate via a polymerization process. The ink may be opaque or translucent after being transferred to the lens substrate.

Figure 3:
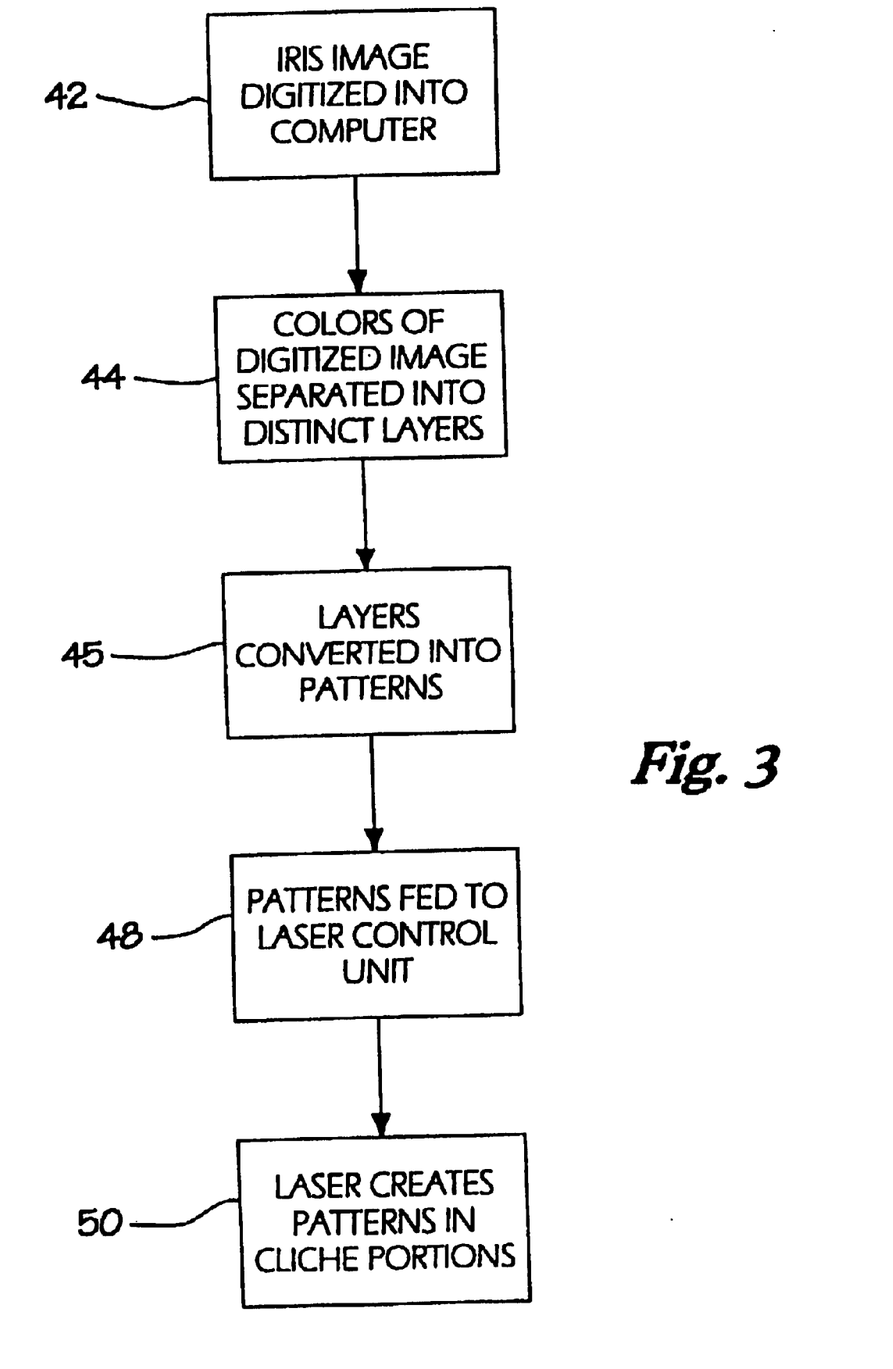
FIG. 3 is a flow chart showing the steps in forming the patterns of FIGS. 2a–d in the cliché portions.

The first sub-process is generally indicated at 40 in the flow-chart of FIG. 3. In the first step, represented by box 42, an iris image is digitized into a computer. Digitizing the iris image may be accomplished by scanning a photograph or rendering of a human iris into the computer, or by use of a digital camera, or by using appropriate software to create an image by the computer itself. It is to be understood that the methods of digitizing an iris image mentioned herein are merely exemplary, and other methods of digitizing an iris image may be employed without departing from the scope of this invention. The digitized iris image may also comprise a hybrid image formed from different aspects of two or more iris images. The computer is preferably any commercially available computer having a suitable processor such as an Intel Pentium-3® processor.

As represented by box 44, the colors of the digitized iris image are separated into selectively distinctive layers by use of commercially available software, such as Adobe Illustrator® or Adobe PhotoShop®. In practice, the iris image is comprised of thousands of tiny colored regions and the colors of the regions may encompass thousands of different colors. The iris image is preferably analyzed by a designer for determining where color separations are to be made. Preferably the image is separated into four, five, six, seven, eight, nine, ten, eleven, twelve, or more distinct color regions. Each color region is preferably mapped via a raster-based image editor, such as Adobe PhotoShop®. Each color region is then converted to grayscale and then converted to a halftone pattern (box 46). Each halftone pattern is then passed through a vector-based computer drawing program, such as Adobe Illustrator®. With the use of the drawing program, the halftone pattern (or digitized image portion) is adjusted and sized for export, preferably as an encapsulated postscript file, to a laser control unit of a suitable laser (indicated by box 48). Each digitized image portion comprises the combination of all of the tiny regions of the digitized iris image assigned to one of the selected color ranges. Preferably, the laser is a yttrium aluminum gamet (YAG) laser, such as an Electrox® Scriba II, commercially available from Electrox USA, Indianapolis, Ind. The laser control unit is preferably operated with suitable software, such as that commercially available from Electrox USA. The cliché 30 (e.g., FIG. 2a) is then aligned with the YAG laser. Referring to box 50, the laser is then operated with appropriate aperture and power settings to meet the pattern width and depth requirements suitable to form the depressions 32, 34, 36, 38 in the portions of the cliché 30. By adjusting the various power settings and/or incorporating multiple passes to the patterns, an operator is able to use the laser to vaporize finite layers of the plate conforming to the exact depression shapes desired. Preferably, the laser is operated using baselines of 2 kilohertz, aperture of 3.8 mm, yielding 5/1000 particle beam, power at 70 watts, and speed frequency of 8 hits per second.

The laser forms each depression in an iris portion pattern to correspond to each digitized image portion. In other words, the digitized image portions combine to represent the digitized iris image, and the iris portion patterns of the depressions combine to represent the iris image to be printed on the contact lens substrate. As discussed above, FIGS. 2a–d show depressions 32, 34, 36, 38 formed in cliché portions. It is to be understood that the cliché portions may be portions of a single cliché or may be portions of multiple cliché's. In other words, the depressions may all be formed in a single cliché 30 or may each be in a separate cliché without departing from the scope of this invention.

Use of a laser to form a depression in a cliché has several advantages over forming a depression by photo etching. To begin with, a depression formed with a laser is capable of greater resolution than a depression formed with a photo etching process. In particular, the resolution capabilities with the laser process is more than 9 times greater than that of the photo etching process. The corrosive nature of the photo etching process applied at higher resolution tends to completely obscure and break down the pattern's definition. The resolution limitation of the photo etching process creates barriers to achieve resolutions requiring increased color variations for multicolored contact lenses. By using a laser process to overcome the limitations in pattern resolution, a broader range of blending colors may be employed to create a tinted contact lens that provides a more natural appearance.

Another advantage of forming a depression with a laser rather than photo etching is elimination of the need to use toxic and hazardous chemicals, such as ferric nitrate, hydrochloric acid and nitric acid. These chemicals increase chances of work related accidents or health issues. These chemicals are also hazardous to the environment and require EPA regulatory compliance for removal and disposal. Also, the unpredictability inherent in the photo etching process makes it difficult to produce depressions of desired depth. The desired depth of a typical depression used in a pad printing process to tint a contact lens is 17–25 microns. Depth variances with a photo etching process are generally ±3–5 microns. If the photo etching process does not achieve the desired depth, the pattern rendered is useless; the plate must be resurfaced and re-lapped and the complete process repeated. Conversely, if the pattern achieves too much depth (which is the tendency in the industry), the evaporation of the excess ink thinners/retardant and polymers are released into the air, thereby decreasing air quality.

Use of the laser process also increases the speed in which depressions may be formed in the cliché. In particular, the labor required to prepare a typical pattern in the cliché via a photo etching process is 3–6 man-hours. The labor to prepare such a pattern via the laser method of the present invention is less than one man-hour. Thus, use of the laser process results in a depression of greater resolution, reduces health risks and decreases cost of manufacture.

Figure 4A:
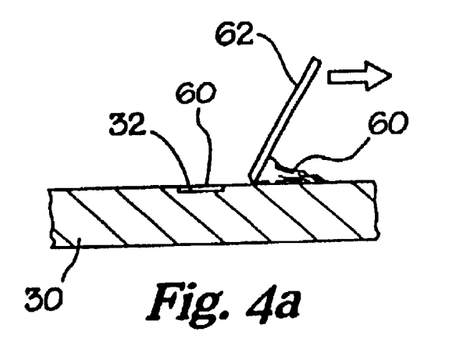
FIG. 4a is a schematic, side elevational view of the cliché portion of FIG. 2a showing ink filling the first depression and a doctor blade passed over the cliché portion to remove excess ink.
Figure 4B:
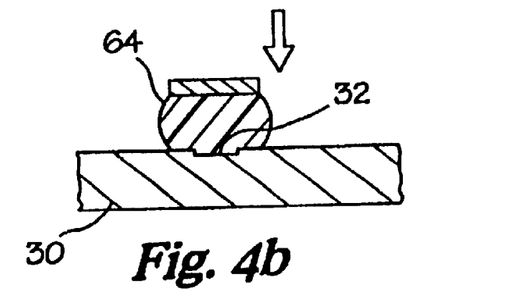
FIG. 4b is a schematic, side elevational view of the cliché portion of FIG. 4a in which a pad-printing pad is pressed against the cliché portion to transfer the ink from the depression to the pad.
Figure 4C:
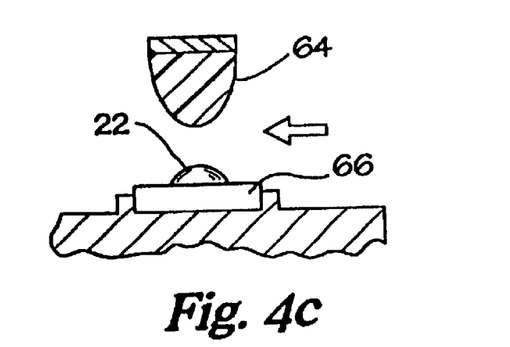
FIG. 4c is a schematic, side elevational view of the pad of FIG. 4b aligned with a blank contact lens substrate.
Figure 4D:
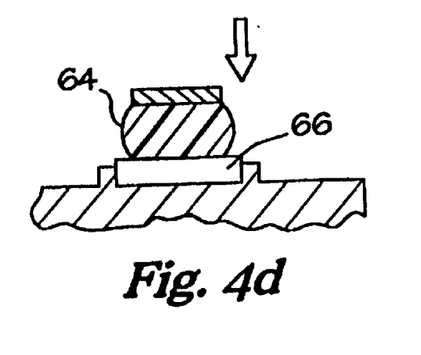
FIG. 4d is a schematic, side elevational view similar to FIG. 4c, but showing the pad pressed against the contact lens substrate to transfer ink from the pad to the lens substrate.
Figure 4E:
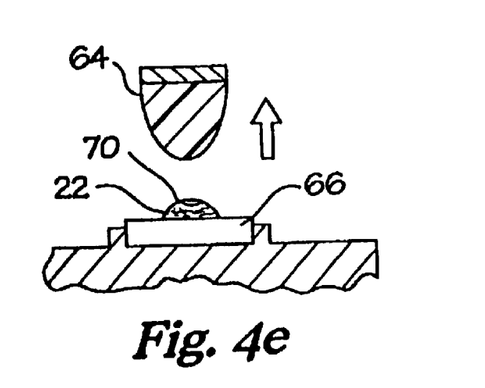
FIG. 4e is a schematic, side elevational view similar to FIG. 4d, but showing the pad removed from the lens substrate to reveal a pattern printed on the lens substrate.

The second sub-process (i.e., transfer of ink from a depression in the cliche to the lens substrate 22) is schematically shown in FIGS. 4*a*–*e*. In FIG. 4*a*, the cliché 30 is shown having a depression 32 flooded with ink 60. A doctor blade 62 is swept across the cliché 30 to wipe the ink 60 from the cliché in a manner so that the ink is in only the depression. As shown in FIG. 4*b*, a conventional pad-printing pad 64 is aligned with the depression 32 and pressed against the cliché 30 to pick up the ink in the depression. The pad 64 is then brought into registration (FIG. 4*c*) with a contact lens substrate 22 held on a lens holder 66 and then pressed (FIG. 4*d*) against the lens substrate to deposit the ink on the substrate in a pattern which constitutes a first design portion 70 of the iris simulating design (FIG. 1). The pad 64 is then released from the lens substrate 22 and the ink is allowed to dry. The first design portion 70 printed on the lens substrate 22 in this manner preferably has substantially the same shape as the pattern of the depression 32. Although not shown, additional design portions are then serially printed on the lens substrate 22 by transferring ink from depressions 34 (FIG. 2*b*), 36 (FIG. 2*c*), 38 (FIG. 2*d*) in substantially the same manner as transferred from depressions 32. Preferably, different ink colors are used for each printing pattern. The design portions (colorant patterns) combine to form the multi-colored iris-simulating pattern 44.

Although the iris-simulating pattern 44 has been described as being formed by the combination of four different colorant patterns printed on the contact lens substrate 22, it is to be understood that more or fewer colorant patterns may be combined to form an iris-simulating pattern (e.g, three, five, six, seven, eight, nine, ten, eleven, twelve, or more colorant patterns) without departing from the scope of this invention. Preferably, however, four to twelve colorant patterns are printed on the lens substrate to form the iris simulating pattern. Also preferably, each colorant pattern is a different color.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of making a contact lens, comprising:
   (a) obtaining a digitized image of an actual iris of a human eye, the image including a plurality of colors; and
   (b) separating the digitized image of the iris into separate colors for reproduction on a multi-colored contact lens having a non-opaque pupil section.

2. The method of claim 1, wherein the digitized image of the iris is obtained from a photograph of an actual iris of a human eye.

3. The method of claim 2, wherein the digitized image of the iris is obtained by scanning a photograph.

4. The method of claim 2, wherein the digitized image of the iris is obtained from a digital camera.

5. The method of claim 1, wherein the digitized image of the iris is obtained by rendering the iris into a computer.

6. The method of claim 1, wherein the digitized image of the iris is created with software of a computer.

7. The method of claim 1, wherein the digitized image of the iris is obtained by scanning an image of the iris.

8. The method of claim 1, wherein the digitized image of the iris comprises a hybrid image of at least two iris images.

9. The method of claim 1, wherein the digitized image is separated into layers.

10. The method of claim 9, wherein the digitized image is separated into at least four layers.

11. The method of claim 9, further comprising:
    (c) reproducing at least one of the layers on the contact lens.

12. The method of claim 11, wherein a plurality of the layers are serially printed on the contact lens.

13. The method of claim 1, wherein a color of the digitized image of the iris is reproduced by applying a colorant to the contact lens.

14. The method of claim 13, wherein the colorant is printed on the contact lens.

15. The method of claim 13, wherein the colorant comprises ink.

16. The method of claim 13, wherein the colorant adheres to the contact lens.

17. The method of claim 13, wherein the colorant is applied to the contact lens by transferring ink from a cliche to the contact lens.

18. The method of claim 1, wherein a color of the digitized image of the iris is reproduced on the contact lens by pad printing.

19. A contact lens, comprising:
    a multi-colored iris simulating design that is obtained from a digitized image of an actual iris of a human eye that has been separated into separate colors of the iris and reproduced on the contact lens to form the multi-colored iris simulating design, the contact lens having a non-opaque pupil section.

20. The contact lens of claim 19, wherein the iris simulating design is located on a surface of the contact lens.

21. The contact lens of claim 19, wherein the digitized image of the iris is obtained from a photograph of an actual human iris, and the iris simulating design comprises ink.

22. The contact lens of claim 19, wherein the iris simulating design comprises ink printed on a surface of the contact lens.

23. The contact lens of claim 19, wherein the contact lens is a corrective lens.

24. The contact lens of claim 19, wherein the iris simulating design comprises at least four layers of colors of the digitized image of the iris.

25. The contact lens of claim 24, wherein the at least four layers of colors are serially arranged on the contact lens.

26. The contact lens of claim 19, wherein the iris simulating design on the contact lens is tinted.

27. The contact lens of claim 19, wherein the iris simulating design comprises ink transferred from a cliche.

28. The contact lens of claim 19, wherein the iris simulating design is obtained from a hybrid digital image of at least two iris images.

29. The contact lens of claim 19, wherein the iris simulating design comprises at least four different colors.

30. The contact lens of claim 19, wherein the iris simulating design is annularly shaped and has a diameter that is less than the diameter of the contact lens.

31. A method of making a contact lens, comprising:

(a) obtaining a digitized image of an iris of an eye comprising a hybrid image of at least two iris images; and (b) separating the digitized image of the iris into separate colors for reproduction on a contact lens.

32. A contact lens, comprising:

a multi-colored iris simulating design that is obtained from a hybrid digitized image of at least two iris images that has been separated into separate colors and reproduced on the contact lens to form the multi-colored iris simulating design.

* * * * *